(12) United States Patent
Hossack et al.

(10) Patent No.: US 6,429,861 B1
(45) Date of Patent: Aug. 6, 2002

(54) METHOD AND APPARATUS FOR EDITING 3-D MEDICAL DIAGNOSTIC ULTRASOUND IMAGES

(75) Inventors: John A. Hossack, Palo Alto; Thilaka S. Sumanaweera, San Jose; Linyong Pang, Stanford, all of CA (US)

(73) Assignee: Acuson Corporation, Mountain View, CA (US)

( * ) Notice: Subject to any disclaimer, the term of this patent is extended or adjusted under 35 U.S.C. 154(b) by 0 days.

(21) Appl. No.: 09/366,392

(22) Filed: Aug. 3, 1999

(51) Int. Cl.$^7$ ............................................... G06T 15/00
(52) U.S. Cl. ....................................................... 345/419
(58) Field of Search ................................. 345/419, 420, 345/421, 422, 661, 662, 663, 664, 665

(56) References Cited

U.S. PATENT DOCUMENTS 6,295,464 B1 * 9/2001 Metaxas ...................... 600/407
6,320,978 B1 * 11/2001 Szeliski et al. .............. 382/154

OTHER PUBLICATIONS

T.R. Nelson, PhD. et al., *Interactive Electronic Scalpel for Extraction of Organs from 3D US Data*, (RENA 1994) Radiology 197, 191 (1995).*

Thomas R. Nelson et al., *Interactive Acquistion, Analysis, and Visualization of Sonographic Volume Data*, Int. J. Imaging Syst. Technol., 8: 26–37, 1997.*

Thomas R. Nelson et al., *Initial Clinical Experience with an Itneractive Volume Sonography Visualization System*, Health Care in the Information Age, IOS Press and Ohmsha, 1996, pp. 21–35.*

* cited by examiner

*Primary Examiner*—Phu K. Nguyen

(57) ABSTRACT

A system for editing a 3-D medical diagnostic ultrasound image dataset displays both a 3-D reconstruction of the dataset and an editing object. A user moves the editing object relative to the 3-D reconstruction with a six degrees of freedom input device that allows the user to control both the position and the orientation of the editing object. The 3-D reconstruction and the associated 3-D dataset are edited to reduce opacity of a portion of a 3-D reconstruction on a selected side of the editing object. The disclosed editing system is fast, efficient and intuitive, and it allows the user to designate the portions of the 3-D dataset to be removed simply and reliably.

18 Claims, 3 Drawing Sheets

METHOD AND APPARATUS FOR EDITING 3-D MEDICAL DIAGNOSTIC ULTRASOUND IMAGES

BACKGROUND

The present invention relates to systems that allow a user to edit 3-D reconstructions of medical diagnostic ultrasonic imaging information in a fast and efficient manner.

It is known in the art to collect 3-D ultrasound datasets. Typically, such datasets represent a regular volume, such as a cuboidal space, by way of example. Generally, the region of interest (ROI) occupies a region near the center of the cuboidal dataset and does not possess a simple geometry. A fetal face can be taken as one example of a region of interest.

Ultrasound B-mode image information is inherently difficult to segment, i.e., to separate one tissue type from another. For this reason, it is common to find the ROI obscured by tissue surrounding the ROI. This surrounding tissue is inherent in the 3-D ultrasound dataset because of its generally regular 3-D shape.

In theory, it may be possible to minimize this problem by controlling the acquisition of the 3-D ultrasound dataset so that no object other than the desired ROI is acquired. However, this is quite difficult to accomplish in practice, and in many situations is practically impossible. In any case, this approach requires considerable skill and patience on the part of the ultrasound operator.

Another prior-art approach is to edit the 3-D ultrasound dataset manually by moving a cursor in 3-D space and by using the cursor to define the unwanted tissue segments. These unwanted tissue segments are then deleted from the ultrasound dataset. This process requires considerable skill and patience. It can also be frustrating, since it is possible to delete the wrong parts of the 3-D ultrasound dataset and then to have to redo the process.

Another prior-art approach is to provide the user with an electronic scalpel to facilitate editing, as disclosed by T. R. Nelson, et al. in "Interactive electronic scalpel for extraction of organs from 3-D US data," "Radiology 197, 191 (1995).

Difficulties in editing 3-D datasets may result in reduced clinical acceptance of 3-D ultrasound imaging. For example, one prior-art approach requires manual editing that can easily take over an hour per 3-D dataset and per region of interest.

BRIEF SUMMARY

By way of introduction, one preferred embodiment described below displays a 3-D reconstruction of a 3-D ultrasound image dataset in combination with an editing object. The editing object defines a line, curve or surface, and the user can move the editing object in an intuitive manner relative to the 3-D reconstruction using a controller having six degrees of freedom. This system automatically edits the 3-D reconstruction to reduce the opacity of a portion of the 3-D reconstruction on a selected side of the editing object. The user can repeatedly position the editing object to remove undesired portions of the 3-D reconstruction, thereby revealing the desired region of interest.

The present invention is defined by the following claims, and nothing in this section should be taken as a limitation on those claims.

BRIEF DESCRIPTION OF THE DRAWINGS

In FIGS. 4 and 5 the region of interest has not been shown for clarity.

DETAILED DESCRIPTION OF THE PREFERRED EMBODIMENTS

Figure 1:
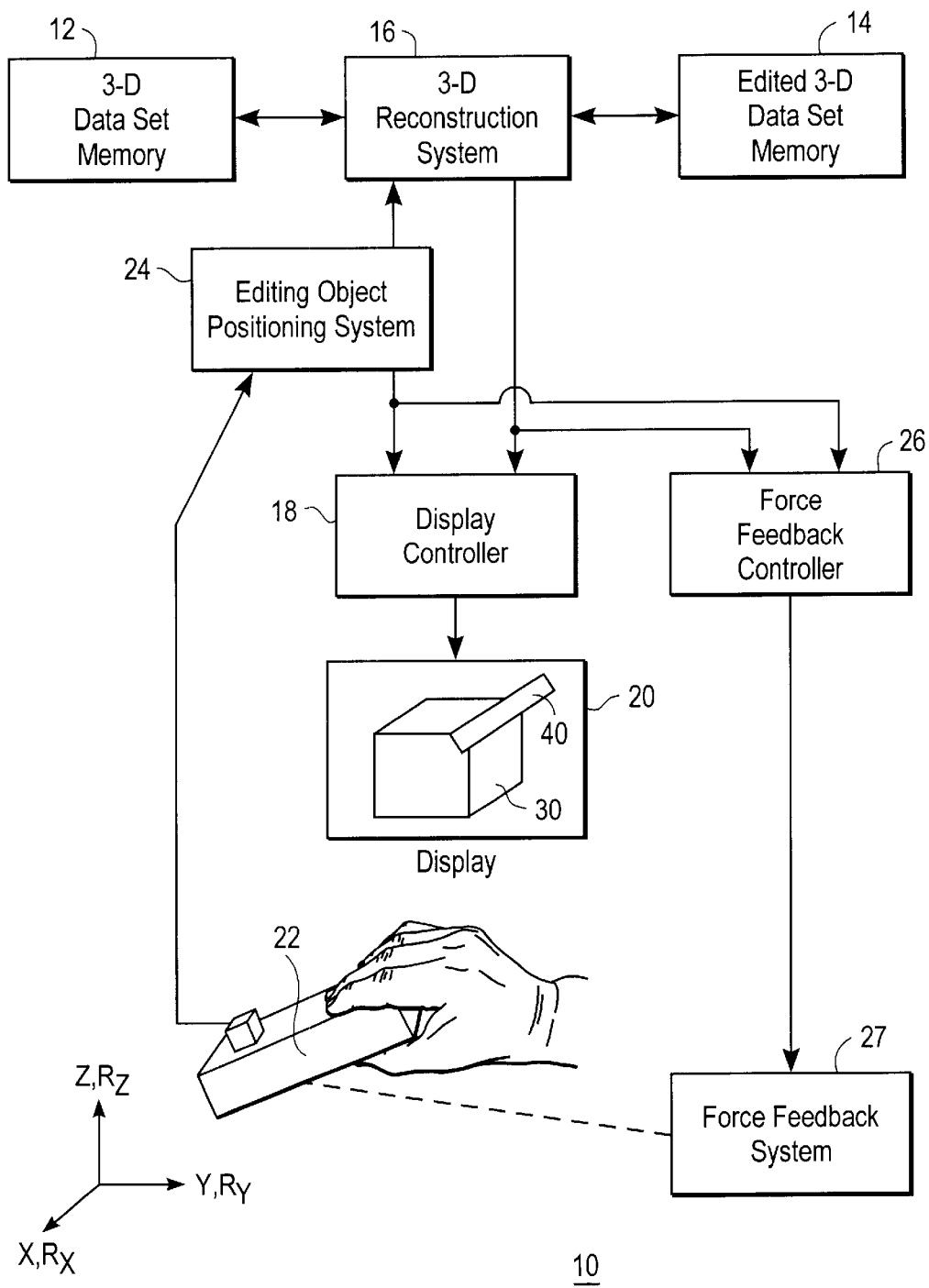
FIG. 1 is a block diagram of a system for editing 3-D medical diagnostic ultrasound image datasets.

Turning now to the drawings, FIG. 1 shows a system 10 for editing 3-D medical diagnostic ultrasound image datasets. The system 10 includes a 3-D dataset memory 12 that stores the original, unedited 3-D dataset. The system 10 also includes an edited 3-D dataset memory 14 that stores edited versions of the 3-D dataset stored in the memory 12. Both of the memories 12, 14 are connected to a 3-D reconstruction system 16 that uses conventional techniques to reconstruct a 3-D image based on the dataset stored in one of the memories 12, 14. The 3-D reconstruction generated by the system 16 is applied to a display controller 18 for display on a monitor 20. Alternatively, only one memory 12 is used. In this alternative each voxel value includes a intensity value, location information, and a transparent nontransparent switch or flag. If this switch or flag is switched to transparent for a particular voxel during editing, the respective voxel does not appear on the output. Later, the switch for one or more voxels can be turned back to the original, nontransparent state, if required.

The system 10 also includes a user input device 22 that in one embodiment takes the form of a wand. The input device 22 is intended to be grasped by the hand of a user such that the user can freely manipulate the input device 22 in three spatial degrees of freedom (X, Y, Z) and three rotational degrees of freedom ($R_X$, $R_Y$, $R_Z$). The input device 22 will on occasion be referred to herein as a six degrees of freedom (DOF) input device. Six DOF input devices are well-known to those skilled in the art and can be implemented in many ways. For example, magnetic position sensing techniques can be used as in the input device marketed by Ascensions pcBird (Burlington, Conn.). Another well-known alternative includes mechanical 6 DOF input devices such as those marketed by Immersion MicroScribe of San Jose, Calif. Also, commercial input devices such as consumer game controllers can be used. The 6 DOF input device can use any suitable coordinate system, including by way of example Cartesian and polar coordinate systems.

The 6 DOF input device 22 is coupled to an editing object positioning system 24. The positioning system 24 uses information from the input device 22 to position an editing object (described below) in the three spatial dimensions (X, Y, Z) and the three rotational dimensions ($R_X$, $R_Y$, $R_Z$), as described below. The positioning system 24 is also coupled to the display controller 18 which presents the editing object 40 on the monitor 20. In FIG. 1 the reference numeral 30 is used to indicate a 3-D reconstruction generated by the system 16, and the reference symbol 40 is used to indicate the editing object 40 generated by the positioning system 24. Note that the editing object 40 is shown adjacent to the 3-D reconstruction 30.

The positioning system 24 also provides information regarding the position of the editing object 40 to the reconstruction system 16. The reconstruction system 16 is programmed to edit the 3-D dataset in response to the position of the editing object, and to store the edited 3-D dataset in the memory 14.

The editing object 40 can be presented in any suitable manner, as for example by a wire frame blade or rectangle, by an opaque object, or by a semi-opaque or translucent object. The shape of the editing object can be varied as desired. A planar shape is illustrated, but in other embodiments the editing object 40 may be provided with a curve similar to that used in sculpting tools. If desired, the user can be allowed to select the size, shape, curvature and other characteristics of the editing object to facilitate the editing process.

When the user moves the input device 22 to cause the editing object 40 to pass through the 3-D reconstruction 30, the 3-D dataset associated with the 3-D reconstruction 30 is edited by removing data, or setting that data equal to zero. For example, all portions of the 3-D dataset corresponding to points on the 3-D reconstruction 30 on one side of the editing object 40 may be set to zero. As the 6 DOF input device 22 is moved in 3-D space, the editing object 40 on the monitor 20 moves in a like manner. The 6 DOF device can also be used to move and/or rotate the 3-D dataset prior to or during editing. This provides for dual use of the 6 DOF device.

Alternatively, the editing object 40 can be used to place seed points on the object of the 3-D reconstruction 30, which the system will later use for separating anatomical structures from the background structures. For example the system will extract all the voxels that are similar to a seed placed by the user using the 6 DOF device. Similarity can be defined by a property such as connectivity or any other property predefined by the user. The extracted voxels for example can be set to zero, thus deleting the anatomical structure, or the background can be set to zero thus only retaining the anatomical structure. Alternatively the opacity of the anatomical structure or the background can be changed.

The system 10 also includes a force feedback controller 25 that receives input data from the editing object positioning system 24 and the 3-D reconstruction system 16. The controller 25 produces force feedback values that are applied as inputs to a force feedback system 27 operatively coupled to the input device 22. The force feedback controller 25 and the force feedback system 27 are optional, but they provide the advantage that the controller 25 provides force feedback to a user as a function of movement of the editing object relative to the 3-D reconstruction, thereby assisting in effective editing.

The input device 22 and the force feedback system 27 can be combined in a controller such as that sold under the trade name Impulse Engine 2000 by Immersion Corporation, San Jose, Calif. This controller includes a 6 degree of freedom input device that incorporates force feedback. As the input device is pushed in a particular direction, the force feedback controller 25 informs the force feedback system 27 to create a defined amount of reactive force. In the present embodiment this feedback can for example be made a function of voxel brightness or intensity. Dense or bright regions of the tissue, when encountered by the editing object, provide more resistance to movement of the editing object and thereby provide an improved, intuitive editing tool. Alternately, darker regions of the image can be chosen to provide more resistance to movement of the editing object.

Figure 2:
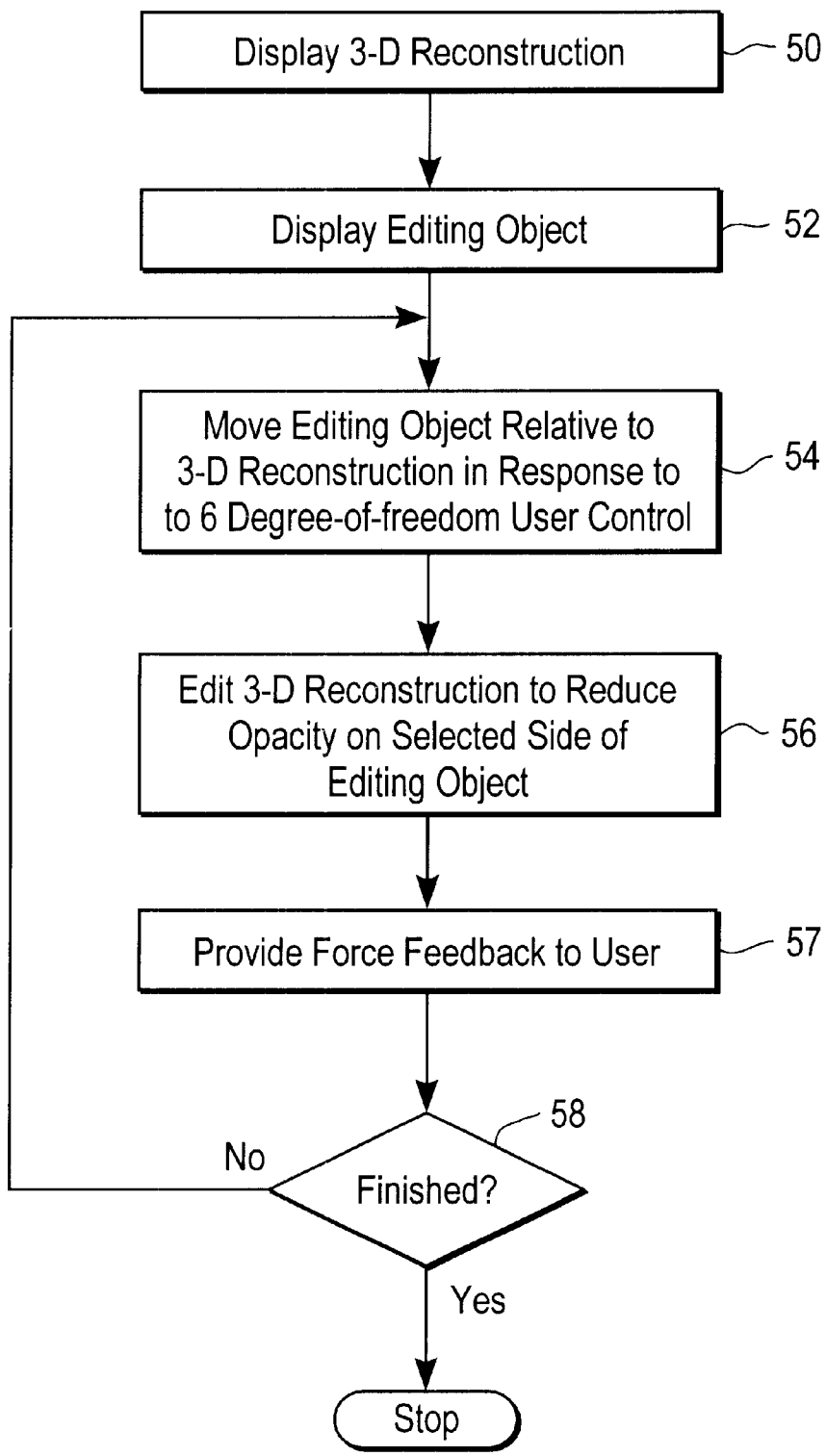
FIG. 2 is a block diagram of a method implemented by the system of FIG. 1.

FIG. 2 provides a flowchart of a method implemented by the system 10 of FIG. 1. As shown in FIG. 2, the 3-D reconstruction is displayed at block 50 and the editing object is displayed at block 52. Then the editing object is moved relative to the 3-D reconstruction in response to 6 DOF user control (block 54). In block 56, the 3-D reconstruction and the associated 3-D dataset are edited to reduce opacity of selected portions of the reconstruction or the dataset on a selected side of the editing object. As pointed out above, in many applications opacity will be reduced to zero. In block 57 force feedback is provided to the user such that when the editing object encounters a bright (high density) voxel or voxels of the 3-D reconstruction, the user experiences an increased reactive force. In block 58, control is returned to block 54 unless the editing process has been finished.

The editing block 56 can be performed by first checking in three-dimensions for adjacency between the spatial region defining the editing object 40 and all of the 3-D objects (polygons or voxels) of the 3-D dataset. The editing object 40 is rotated as required to allow editing on all sides of the 3-D reconstruction. The 6 DOF input device 22 produces a stream of 6 DOF data, and this 6 DOF data is used to register the position of the editing object 40 with the position of features of the 3-D dataset.

Preferably, all edits to the 3-D dataset are recorded so that any mistakes can be reversed. For example, the last ten edits may be stored by the reconstruction system 16 to allow the user to undo up to ten edits if desired.

Figure 3:
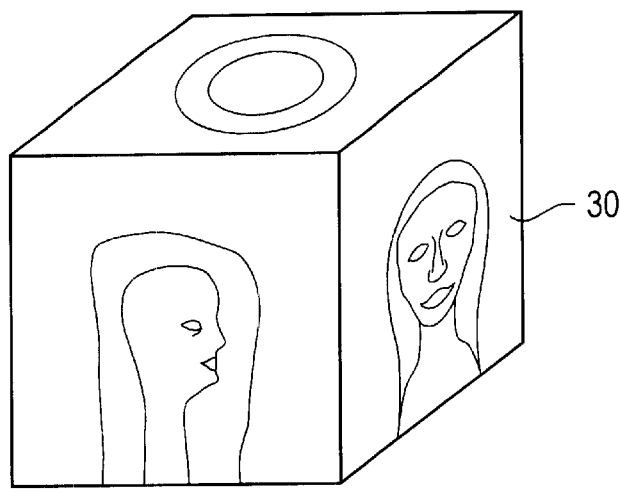
FIGS. 3, 4 and 5 are schematic perspective views of a 3-D reconstruction at three editing stages.
Figure 4:
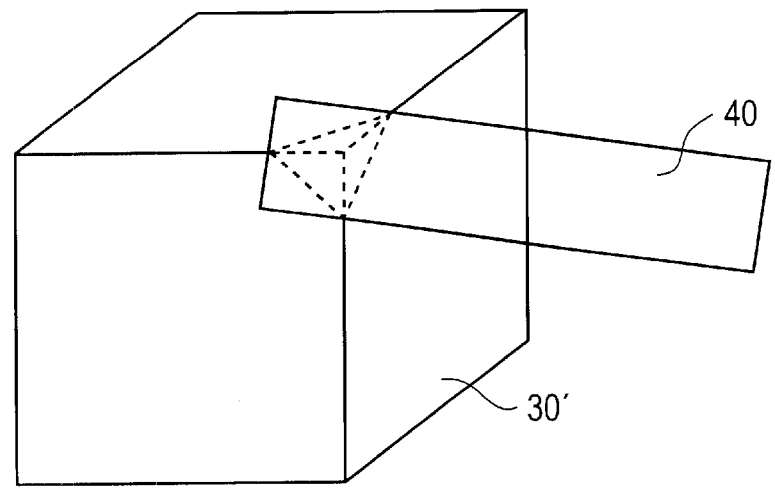
Figure 5:
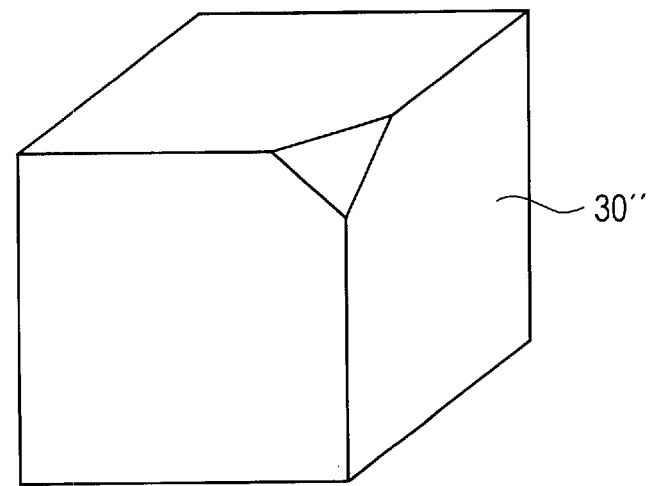

FIGS. 3–5 illustrate three stages in the method of FIG. 2. In FIG. 3, the 3-D reconstruction 30 is shown prior to any editing. As shown schematically in FIG. 3 by way of projection, a fetal head is imbedded near the center of a cubic 3-D dataset from which the 3-D reconstruction 30 was formed. In FIG. 3 the top, side and front views of the fetal head are shown merely for clarification. FIG. 4 shows a subsequent stage in the editing process, in which the editing object 40 has been moved to slice through one corner of the 3-D reconstruction 30. Note that in FIG. 4 the corner of the 3-D reconstruction 30 on one side of the editing object 40 is shown in dotted lines, indicating that it will be deleted in a subsequent stage of the editing process.

FIG. 5 shows the resulting edited 3-D reconstruction 30, in which the corner has been rendered transparent, effectively removing it from the 3-D reconstruction. Both the 3-D reconstruction and the associated 3-D dataset are edited at the same time, and the edited 3-D dataset is stored in the memory 14 of FIG. 1.

Using the system 10 and the method of FIG. 2, editing or sculpting a 3-D dataset is extremely intuitive. As the user moves the input device 22 (FIG. 1) the editing object 40 moves in, out and around the 3-D reconstruction 30 on the monitor 20. All portions of the 3-D reconstruction 30 cut by the editing object 40 are eliminated from the reconstruction 30 and the associated edited 3-D dataset.

It should be apparent from the foregoing detailed description that the editing method described above is intuitive and well adapted to facilitate wide user acceptance of 3-D medical diagnostic ultrasound images.

Of course, many changes and modifications can be made to the preferred embodiments described above. The size, shape and curvature of the editing object can be adapted as desired, and any suitable input device can be used. A wide variety of conventional programming techniques can be used to implement the positioning system 24 and the reconstruction system 16. The memories 12, 14 can take any suitable form, including semiconductor memory, magnetic memory, optical memory and the like.

The foregoing detailed description has discussed only a few of the many forms that this invention can take. For this reason this detailed description is intended only by way of illustration, and not by way of limitation. It is only the following claims, including all equivalents, that are intended to define the scope of this invention.

What is claimed is:

1. A method for editing a 3-D medical diagnostic ultrasound image dataset comprising:
   (a) displaying a 3-D reconstruction of a 3-D medical diagnostic ultrasound image dataset;
   (b) displaying an editing object adjacent to the 3-D reconstruction;
   (c) moving the editing object relative to the 3-D reconstruction in response to user control of both position and orientation of the editing object; and
   (d) editing the 3-D reconstruction to change at least one property of at least one portion of the 3-D reconstruction selected by the editing object.

2. The method of claim 1 wherein the editing object comprises a planar blade.

3. The method of claim 1 wherein (c) comprises:
   (c1) receiving a user control signal that commands position changes of the editing object along three position axes and orientation changes of the editing object along three rotation axes; and
   (c2) moving the editing object along the three position axes and the three rotation axes in response to the user control signal.

4. The method of claim 1 wherein (c) comprises:
   (c1) moving the editing object relative to the 3-D reconstruction in six degrees of freedom in response to user control of both position and orientation of the editing object.

5. The method of claim 1 wherein (d) comprises semi-automatically segmenting the 3-D reconstruction using at least one user-placed seed.

6. The method of claim 1 wherein (d) comprises semi-automatically segmenting the 3-D reconstruction based on similarity.

7. The method of claim 1 further comprising:
   (e) providing force feedback to a user as a function of movement of the editing object relative to the 3-D reconstruction in (c).

8. The method of claim 1 further comprising:
   (e) providing force feedback to a user as a function of position of the editing object and a portion of the 3-D reconstruction in a vicinity of the editing object.

9. The method of claim 1 further comprising:
   (e) providing increased force feedback to a user as the editing object encounters brighter portions of the 3-D reconstruction in (c).

10. The method of claim 1 further comprising:
    (e) providing increased force feedback to a user as the editing object encounters darker portions of the 3-D reconstruction in (c).

11. An editing system for a 3-D medical diagnostic ultrasound image dataset comprising:
    means for displaying a 3-D reconstruction of a 3-D medical diagnostic ultrasound image dataset;
    means for displaying an editing object adjacent to the 3-D reconstruction;
    means for moving the editing object relative to the 3-D reconstruction in response to user control of both position and orientation of the editing object; and
    means for editing the 3-D reconstruction to reduce opacity of a portion of the 3-D reconstruction on a selected side of the editing object.

12. The system of claim 11 wherein the editing object comprises a planar blade.

13. The system of claim 11 wherein the moving means comprises:
    means for receiving a user control signal that commands position changes of the editing object along three position axes and orientation changes of the editing object along three rotation axes; and
    means for moving the editing object along the three position axes and the three rotation axes in response to the user control signal.

14. The system of claim 11 wherein the moving means comprises:
    means for moving the editing object relative to the 3-D reconstruction in six degrees of freedom in response to user control of both position and orientation of the editing object.

15. The system of claim 11 further comprising:
    means for providing force feedback to a user as a function of movement of the editing object relative to the 3-D reconstruction.

16. The system of claim 11 further comprising:
    means for providing force feedback to a user as a function of position of the editing object and a portion of the 3-D reconstruction in a vicinity of the editing object.

17. The system of claim 11 further comprising:
    means for providing increased force feedback to a user as the editing object encounters brighter portions of the 3-D reconstruction.

18. The system of claim 11 further comprising:
    means for providing increased force feedback to a user as the editing object encounters darker portions of the 3-D reconstruction.

* * * * *